Figure 1:
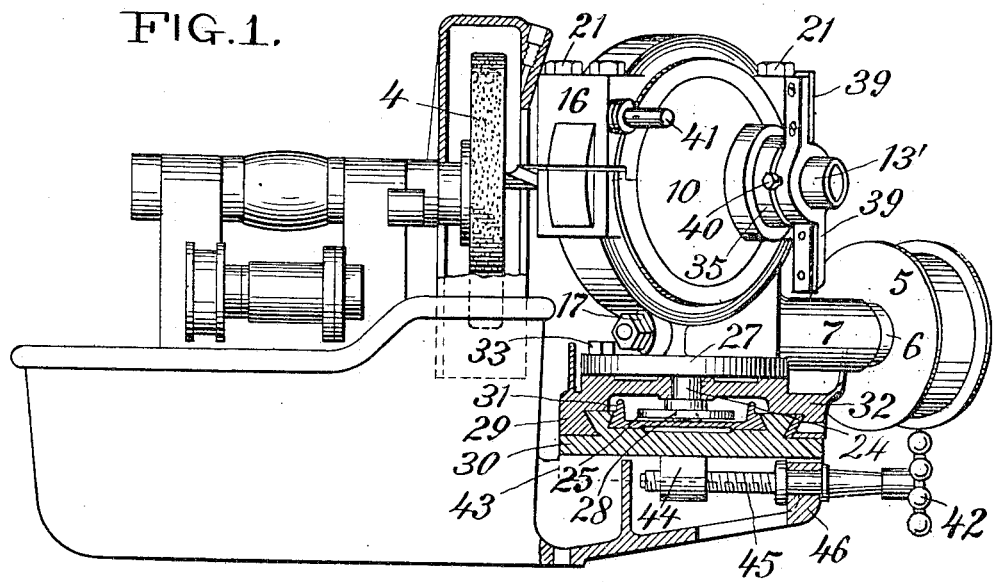

No. 819,173. PATENTED MAY 1, 1906.
F. SCHMALTZ.
DRILL GRINDING MACHINE.
APPLICATION FILED JULY 5, 1904.

7 SHEETS—SHEET 1.

WITNESSES:

INVENTOR
Friedrich Schmaltz
BY
Edward P. Thompson
ATTORNEY

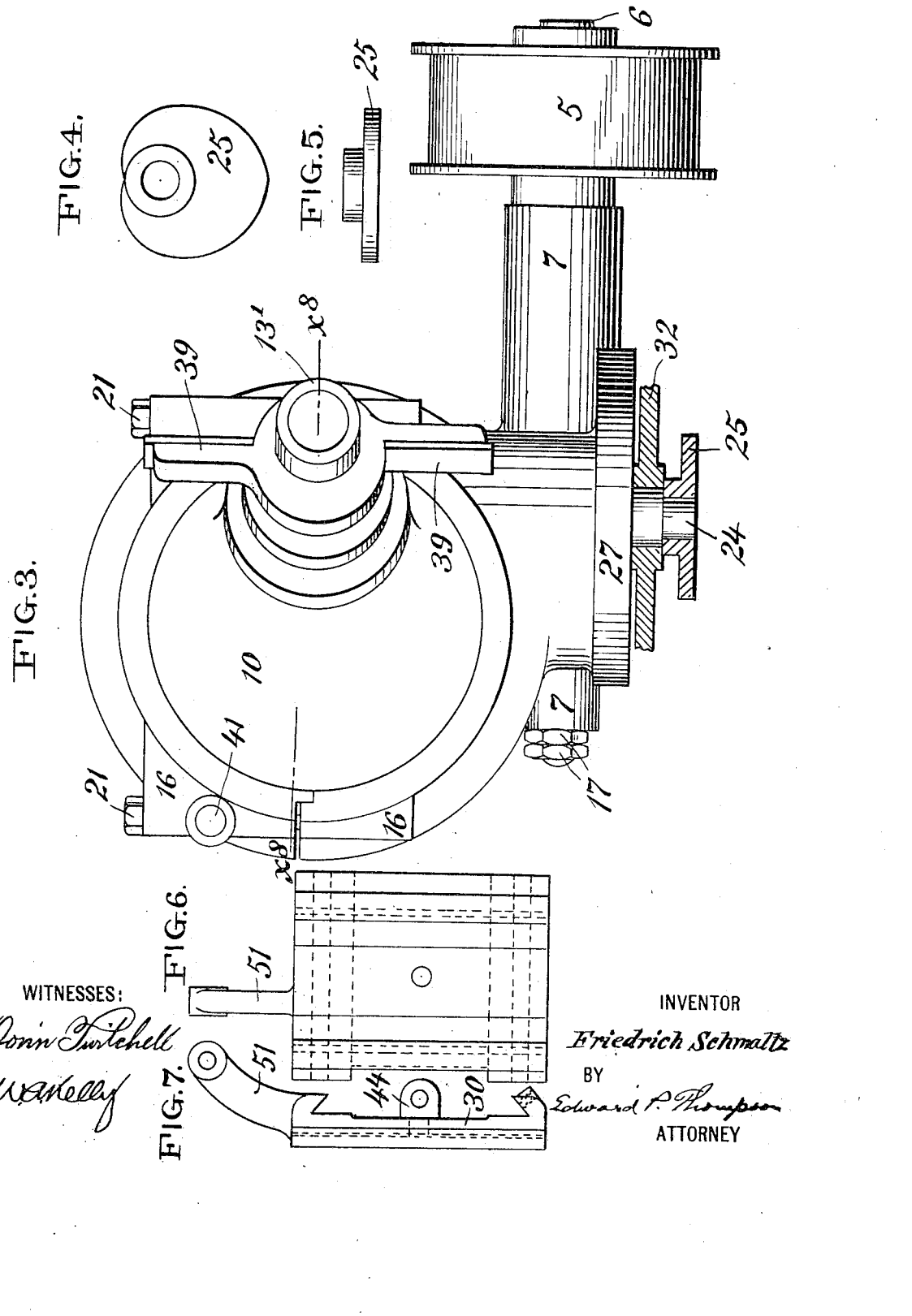

No. 819,173. PATENTED MAY 1, 1906.
F. SCHMALTZ.
DRILL GRINDING MACHINE.
APPLICATION FILED JULY 5, 1904.
7 SHEETS—SHEET 3.
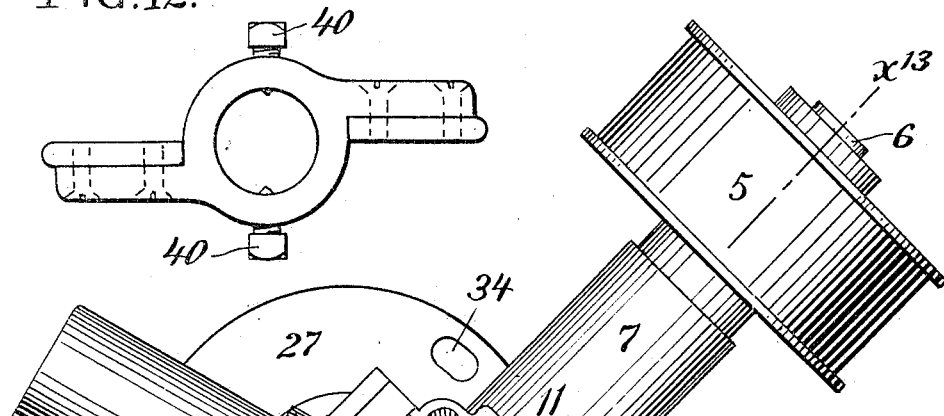
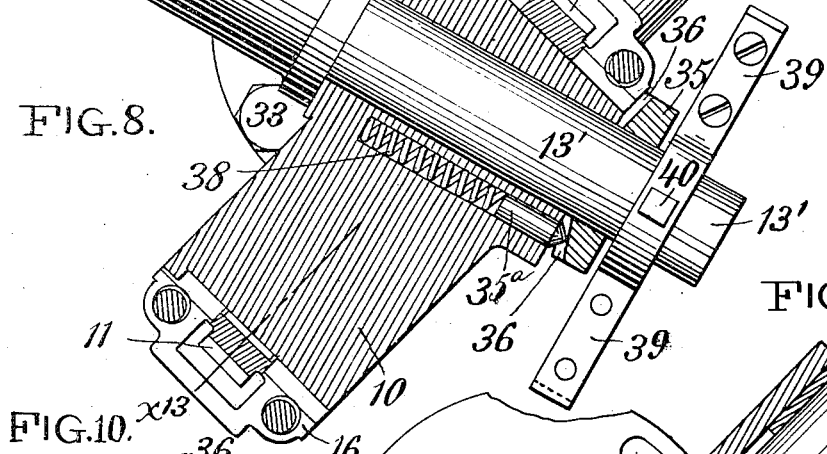
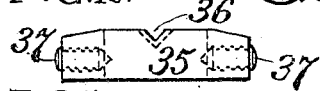
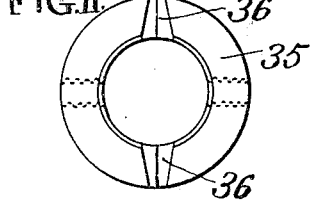
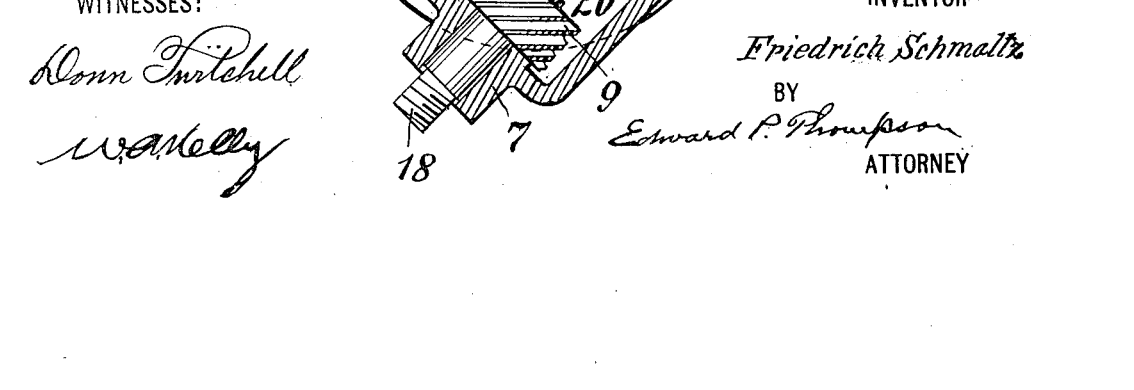
WITNESSES:
INVENTOR
Friedrich Schmaltz
BY
Edward P. Thompson
ATTORNEY No. 819,173. PATENTED MAY 1, 1906.
F. SCHMALTZ.
DRILL GRINDING MACHINE.
APPLICATION FILED JULY 5, 1904.
7 SHEETS—SHEET 4.
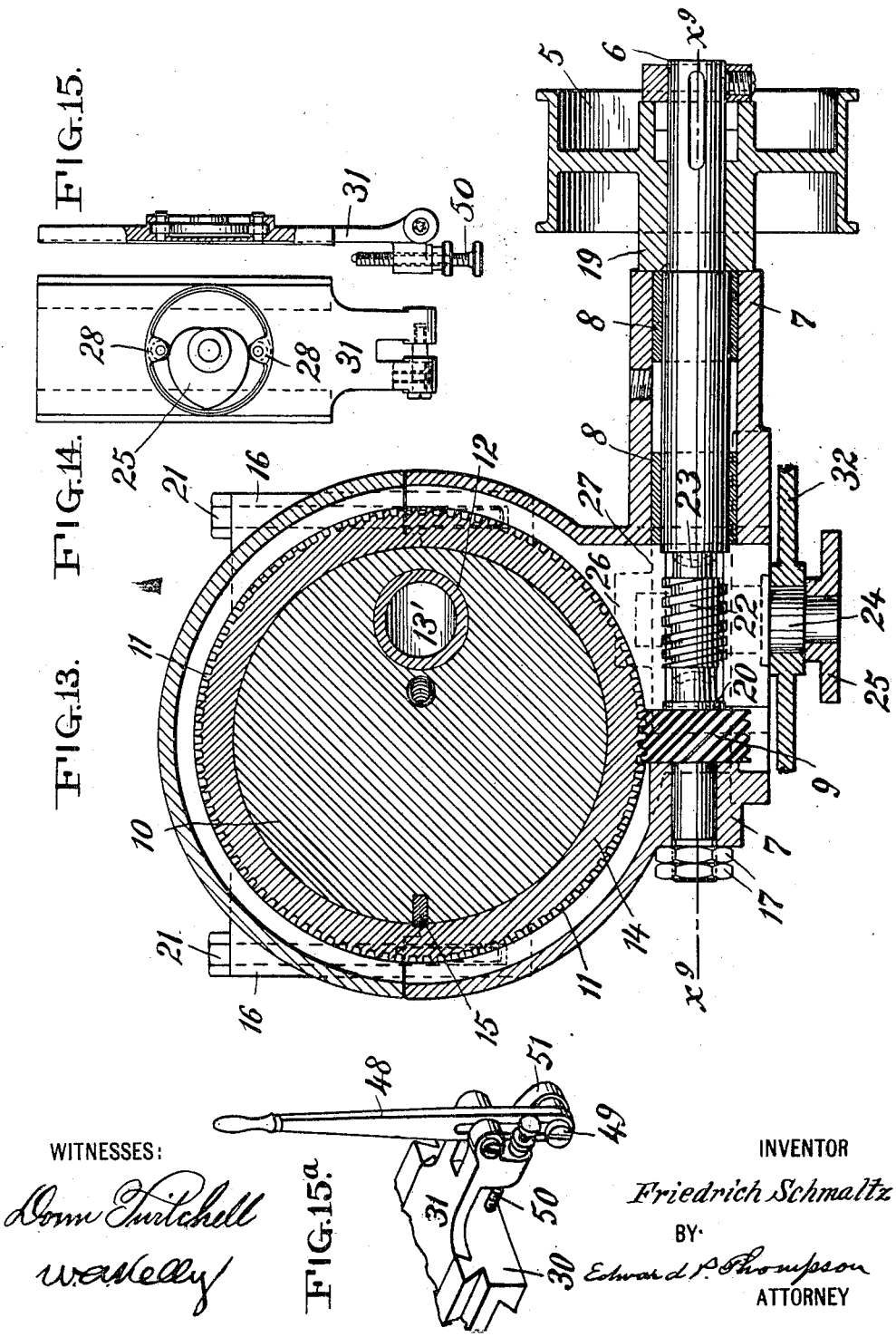
WITNESSES:
INVENTOR
Friedrich Schmaltz
BY
Edward P. Thompson
ATTORNEY No. 819,173. PATENTED MAY 1, 1906.
F. SCHMALTZ.
DRILL GRINDING MACHINE.
APPLICATION FILED JULY 5, 1904.
7 SHEETS—SHEET 5.
FIG. 16.
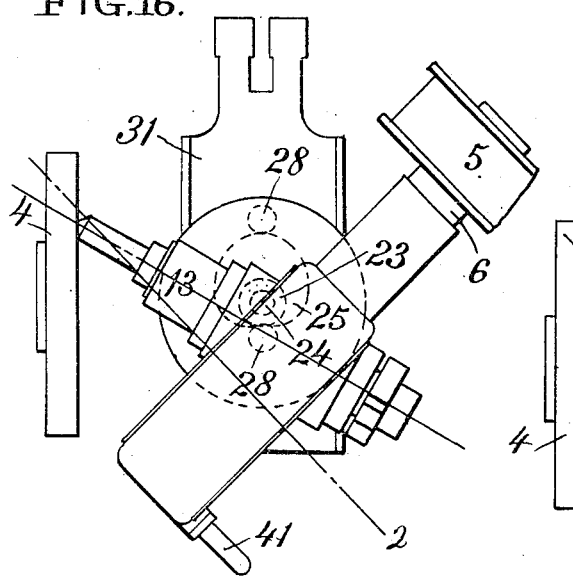
FIG. 17.
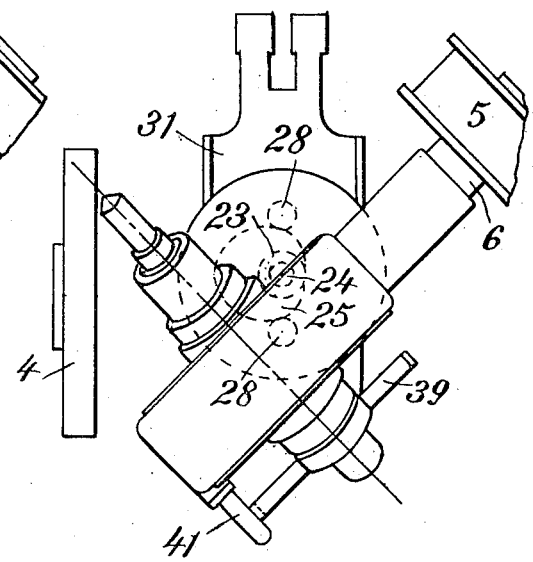
FIG. 18.
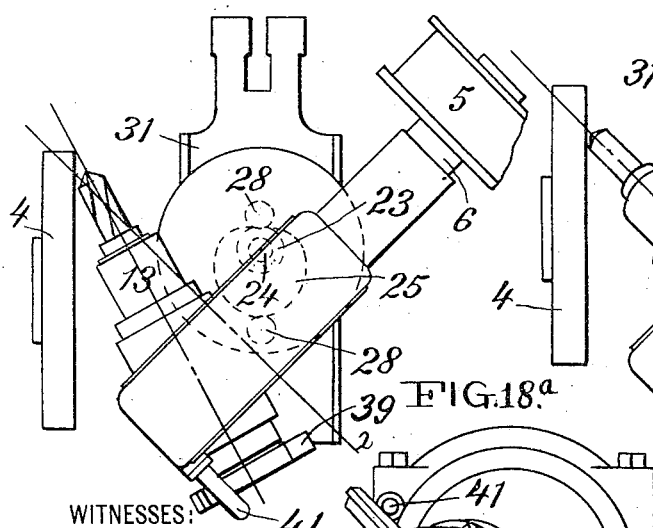
FIG. 19.
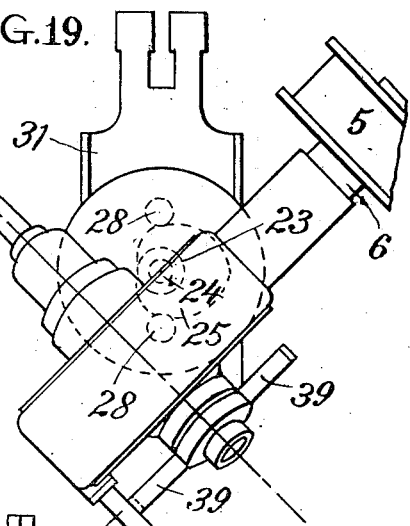
FIG. 18a
WITNESSES:
Donn Turtchell
W. A. Kelly
INVENTOR
Friedrich Schmaltz
BY
Edward P. Thompson
ATTORNEY No. 819,173. PATENTED MAY 1, 1906.
F. SCHMALTZ.
DRILL GRINDING MACHINE.
APPLICATION FILED JULY 5, 1904.

7 SHEETS—SHEET 6.

WITNESSES:
Donn Twitchell
Wakelly

INVENTOR
Friedrich Schmaltz.
BY
Edward P. Thompson
ATTORNEY

No. 819,173. PATENTED MAY 1, 1906.
F. SCHMALTZ.
DRILL GRINDING MACHINE.
APPLICATION FILED JULY 5, 1904.

7 SHEETS—SHEET 7.

WITNESSES:
Donn Turtchell
W A Kelly

INVENTOR
F. Schmaltz.
BY
Edward P. Thompson
ATTORNEY

UNITED STATES PATENT OFFICE.

FRIEDRICH SCHMALTZ, OF MÜHLWEG, OFFENBACH-ON-THE-MAIN, GERMANY.

DRILL-GRINDING MACHINE.

No. 819,173.  Specification of Letters Patent.  Patented May 1, 1906.

Application filed July 5, 1904. Serial No. 215,292.

*To all whom it may concern:*

Be it known that I, FRIEDRICH SCHMALTZ, a subject of the German Emperor, and a resident of Mühlweg, Offenbach-on-the-Main, in the Empire of Germany, have invented certain new and useful Improvements in Drill-Grinding Machines, of which the following is a specification.

As far as some of the broader claims in this specification are concerned my present application for a patent is a division of my former application, Serial No. 169,118, filed August 11, 1903.

The invention relates to a machine having automatic movements for presenting the cutting edges of the drill to the grinding-disk successively and grinding the conical surfaces behind said edges to produce clearances of said surfaces with respect to the material bored.

Without regard to the various scopes of the invention, which are attended to in the claims hereinafter inserted, the general nature of the invention comprises a drill-holder constantly revolving about an outside axis and intermittently rotating about its own axis, the curve of revolution being oblique and tangent to a plane grinding-surface, these motions being produced automatically by a driver and so timed and proportioned that by the time that any cutting edge comes into contact and coincides with said plane surface it has both revolved in a curve and rotated about the axis of the drill, as explained in detail hereinafter.

More specifically, the organization comprising the invention consists of a drill-holder, mechanism and a handle for reciprocating the holder in a different direction from the other reciprocations.

All the details for answering the claims herein are exhibited in the accompanying drawings, which I will now describe.

Figure 2:
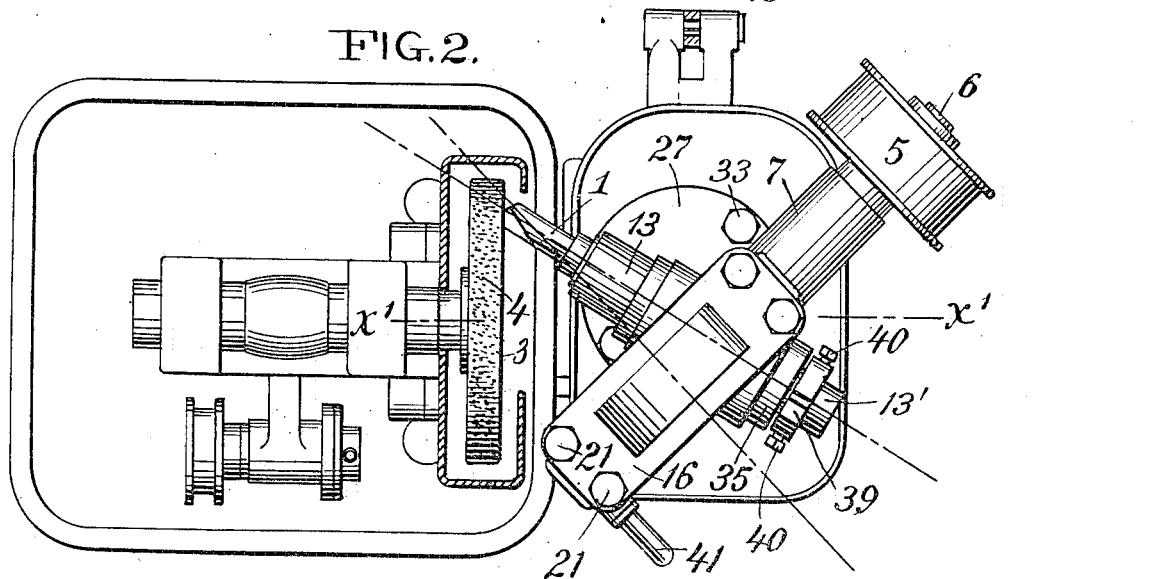
Figure 20:
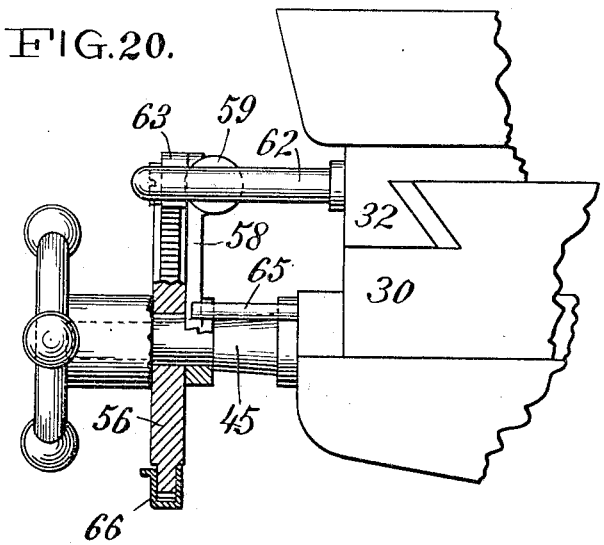
Figure 21:
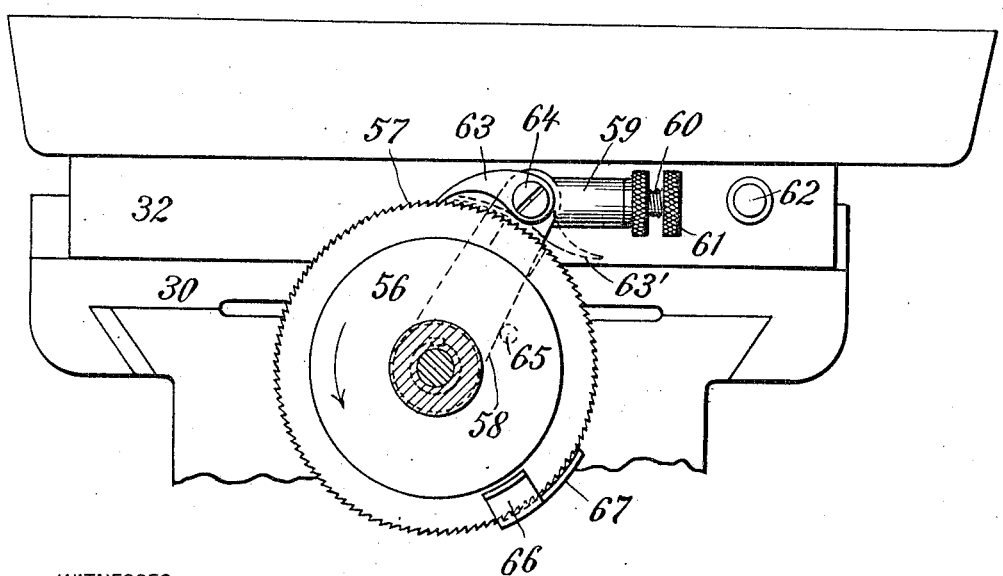
Figure 22:
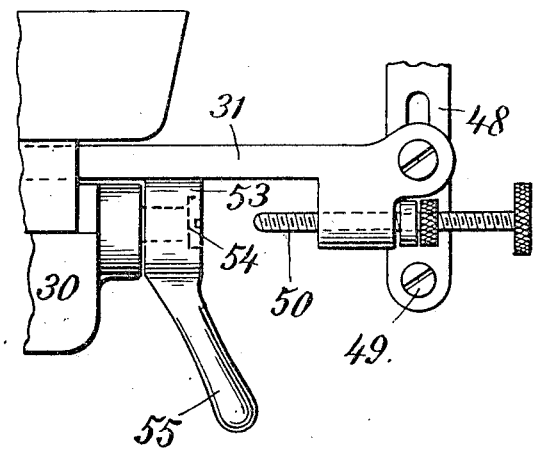
Figure 23:
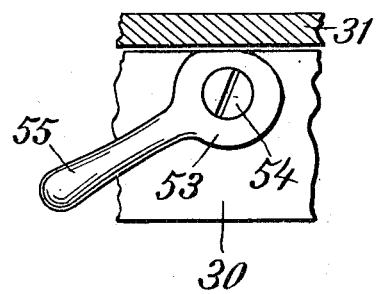
Figure 24:
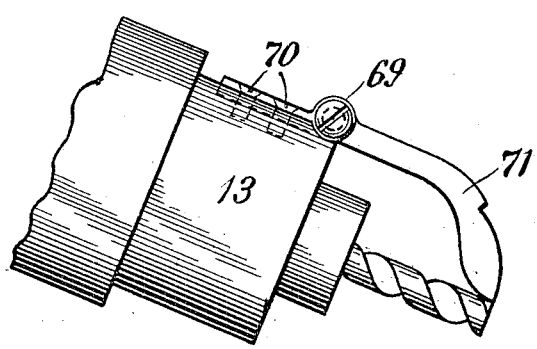
Figure 25:
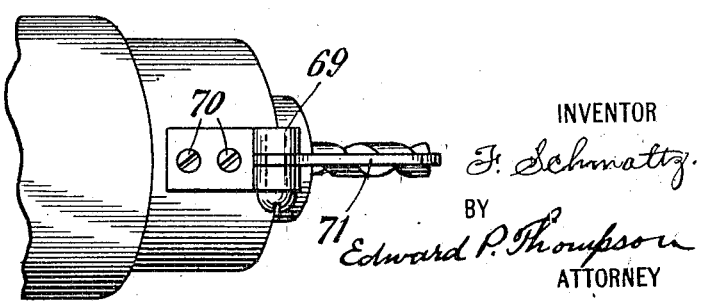

Figure 1 is a side elevation with the lower right-hand portion in section at about below the line $x'$ $x'$ in Fig. 2. The casing of the grinding-wheel is shown partly dotted. Fig. 2 is a plan of the machine. Fig. 3 is an oblique view of one end of the machine by itself viewed along the axis of the socket-wheel which carries the drill-holder eccentrically. At the lower part of the figure certain details are shown in section. Figs. 4 and 5 are different outside views of the cam which is shown in section in Fig. 3. Figs. 6 and 7 represent certain slides isolated and identified by reference-numerals. Fig. 8 is a plan, partly in section, of the mounting of the drill-holder especially and other elements substantially similar to the essential elements in Figs. 1, 2, and 3 as far as shown. The large piece in section is the socket-wheel carrying the drill-holder eccentrically. The section is taken at about the line $x^8$ $x^8$ in Fig. 3. Fig. 9 is a horizontal partial section through the axis of the driving-shaft, showing especially the gearing for automatically reciprocating the drill radially with respect to the grinding-disk. The section is taken at line $x^9$ $x^9$ in Fig. 13. Figs. 10 and 11 are different views of one portion of the clutch shown in section in Fig. 8 when it is represented in conjunction with the other part of the clutch. Fig. 12 is a different view of the clutch-disengaging device shown in plan in Fig. 8 and in some other figures. Fig. 13 is a vertical section at the line $x^{13}$ $x^{13}$ in Fig. 8. Fig. 14 is a plan of the cam-holder, and Fig. 15 is a side view of the same shown partly in section. Fig. 15$^a$ is a perspective of the handle for adjusting the slide 31. Figs. 16, 17, 18, and 19 are intended as mere outlines of certain elements for representing different phases of the drill with respect to the grinding-disk. Fig. 18$^a$ is a side view of the construction in Fig. 18, showing the same phase. Figs. 20 and 21 are different views of an attachment which may be added to the machine, if desired. Figs. 22 and 23 are different views of the brake for holding the slide 31 stationary with respect to the cam 25, hereinafter described. Figs. 24 and 25 are different views of an attachment for the drill-holder.

I will first describe the mechanism involved for revolving the drill 1 about an outside axis 2 obliquely to the plane surface 3 of the grinding-disk 4. This organization consists of a driving-pulley 5, mounted upon a shaft at 6 and carrying the bearings 7, having bushings 8 and a spiral gear-pinion 9, engaged with a tooth-wheel 10, serving as a socket-wheel, and having teeth 11 and carrying in the socket 12 a drill-holder 13 for holding the drill 1. This holder 13 passes through the socket 12 both eccentrically and obliquely, so that the axis of the holder 13 and the axis of the socket-wheel 10 intersect each other at a point preferably in the material of the drill 1 or else at a point beyond the drill, but not coincident with the point of the drill, for if the latter occurs the point of the drill would not move to and from the disk 4. The teeth 11 are cut upon a ring 14, which is keyed by the key 15 upon a periphery of the wheel 10, which is rotary in split bearings 16, which surround the circumference of the wheel 10. When the pulley 5 is driven, the spiral pinion 9 rotates the wheel 10, which causes the holder 13 to revolve in the path of a conical surface and the point of the drill to move in a circle. These motions are continuous from the beginning to the ending of the sharpening operation irrespective of several other motions. Nuts 17 on the threaded end 18 of the shaft 6, together with the hub 19 of the pulley 5, serve to retain the shaft at 6 in the bearings 7. The pinion 9 is retained between the collar 20 on the shaft 6 and the left-hand bearing 7. The parts of the split bearing are held together by bolts 21. The holder 13 has a reduced portion 13', which extends through the socket 12. The organization for accomplishing the intermittently-reciprocating motion comprises a worm 22 on the shaft 6, a worm-wheel 23 gearing with the worm 22 and carrying on its shaft 24 a heart-shaped cam 25. This cam 25 continually rotates. Bearing upon the active part of the cam are two rollers 28, diametrically located and stationary with respect to the cam. Consequently as the cam rotates the frame or plate 27, together with the slide 29, which is mounted upon a dovetail guide 30, has intermittent motions, or, more specifically, it is reciprocated, thereby imparting similar motions to the tool-holder 13 for the purpose of feeding the drill radially with respect to the grinding-disk for preventing wear of the disk in a very narrow margin. Besides this there is a slide 31, which carries the rollers 28. The shaft 24 has its bearings in the slide 32, by which it is supported, being suspended from the base-plate of the holder. This base-plate 27 is fixed to the slide 32 by bolts 33, so that the holder 13 reciprocates in unison with the body of the cam 25. Exact adjustment of the plate 27 with respect to the cam for securing slight variations of the angle between the drill 1 and the disk 3 may be attained, because of the elongated holes 34, through which pass the bolts 33. I will now describe the arrangement for rotating a tool-holder through equal arcs during every revolution of the holder. On the reduced portion 13 of the holder is one part of a clutch, consisting of a disk 35, having notches 36 and set-screws 37 for fixing the disk 35 upon a holder portion 13'. This disk 35 has two notches diametrically located for clutching at every half a revolution. The other part of the clutch is a pin 35ª, pressed into one of the notches 36 by a spring 38 and supported in a hole in the wheel 10. Also on the holder portion 13' is a projection 39, extending from both sides of the holder and fastened thereto by set-screws 40, while there is a stop 41 on the bearing 16 and located in the path of the projection 39, which may be considered as made up of two projections, the stop 41 being first in the path of one projection and next in the path of the other projection. As the wheel-pin rotates, considering the stop 41 omitted, the holder 13 evidently does not rotate on its axis, but solely revolves around the axis of the socket-wheel 10; but when the stop 41 is present, as it always is, the projection 39, which strikes it, is stopped, and consequently, in view of the continued revolution of the holder 13, rotates as long as the stop 39 presses against the stop 41. After a while—namely, after half a revolution—the stop 41 leaves the projection 39, and therefore the holder 13 ceases to rotate upon its axis, but is clutched by the pin 37 to prevent it from accidentally falling around to a wrong position. Everything is timed for obtaining the final result of the drill cutting edge coinciding with the grinding-surface of the disk when the two meet. In view of the construction, the next time they meet the next cutting edge will come in contact with the grinding-surface. While the drill is in contact, its conical surface behind the cutting edge will be ground and at the same time abnormally tapered for the purpose of clearance. 42 is the handle for feeding the guide 30, which is at the same time itself a slide, as indicated at the dotted line 43, said slide having a threaded lug 44 on its under side. The handle has a screw 45 in bearings on the frame 46 and engages with the lug 44 for moving the slide 30 to and fro, and hence the tool-holder 13 to and from the disk 4, so as to adjust the drill 1 at the beginning of the operation to the proper position for automatic grinding. Although these motions have been separately described, they do not occur individually. Of course one motion causes a variation of another motion; but still each motion may be considered as taking place for purposes of clearer definition in the claims. For example, the reciprocating movement of the holder by the action of the cam 25 when combined with the circular revolution of the holder results not in a perfect circular motion of the drill-holder, and yet the drill may be said to have a circular movement, a revolving movement, and radial movements.

Parts not numbered and referred to are either well known in the art or have nothing to do with the invention as set forth in the claims; but they are shown to assist in identifying and of locating the essential elements.

The grinding or sharpening of the drill takes place during the revolving motion of the same, and the semirotation for bringing the other cutting edge in the right position for grinding occurs when the drill is away from the grinding-disk. It is the clutch-pin 37 that prevents the drill from rotating while it is being ground. It is the stop 41 that prevents only the same cutting edge from coming to the disk. When there are two cutting edges, they are ground alternately.

When the lever-handle 48 is thrown around the pivot 49, it moves the slide to any new position to wear a still wider portion of the grinding-disk through the agency of the drill. The screw 50, carried by the slide 31, gages the throw of the slide 31. The lever is pivoted to the arm 51 on the slide 30.

My invention may be modified without departing from the sprit thereof. For example, the following additions may be made thereto: In order to cause the feed of the slide 32 to be automatic, in addition to regulation by the handle 42, I have provided means shown in Figs. 20 and 21. A disk 56 is fixed upon the spindle-screw 45, that carries the handle 42. Teeth 57 are provided upon the periphery of the disk 56. A loose lever 58 is on the same spindle and has a rigid arm 59. A screw-spindle 60 with a turning-head 61 screws into the arm 59 for regulating the distance between itself and the projection 62 on the slide 32, which slides back and forth. The arm carries also a loose pawl 63, engaging with the teeth 57, which may, if desired, be thrown upside down and out of the way of the teeth, as shown at the dotted lines 63'. In Figs. 22 and 23 is a brake. It locks the slide 31, which carries the rollers 28 for the cam 25, so that said cam will by rotating move the tool-holder 13 back and forth. It is necessary for the slide 31 to be rigid, or else it would be caused to slide by the action of the cam 25, whereas this cam should feed the tool only over the surface of the grinding-disk 4. The brake is an eccentric 53 on a pivot 54, which in turn is on the slide 30. The eccentric 53 has an arm 55, which when turned compresses the eccentric against the slide 31. This brake 53 is not visible in Fig. 15ª, as it is below the slide 31, and it is omitted from the other figures, or the action of the pawl upon the disk 56 may be stopped at any future time by the slide 66, fitting loosely upon the disk and having a cover 67 over a few of the teeth 57. Normally the arm 58 rests upon the stationary pin 65; but as the slide 32 reciprocates in the manner hereinbefore set forth the projection 62 intermittently turns the disk 56 through the action of the pawl 63, and consequently feeds the drill a minute distance corresponding to the amount of the metal of the drill cut off by the grinding action.

I have provided a gage adjustable to the drill-holder, and by means of the same the exact cut of the drill may be obtained. Its object, therefore, is to mark off the amount of metal which will have to come off by means of the grinding-disk. It consists of a bearing 69, fastened on the holder 13 by screws 70 and carrying a gage 71, pivoted in the bearing 69, and therefore adapted to rest upon the drill or to be thrown back out of the way of the grinding-disk.

I claim as my invention—

1. In a machine for grinding drills, the combination of a drill-holder continuously revolving about an outside axis, and intermittently rotary about its own axis, and a driver connected up with said holder for producing those two motions.

2. In a machine for grinding drills, the combination of a drill-holder continuously revolving about an outside axis, and intermittently rotary about its own axis, a driver connected up with said holder for producing those two motions, and means for causing the intermittent rotations to be through equal curves.

3. In a machine for grinding drills, the combination of a drill-holder continuously revolving about an outside axis and intermittently rotary about its own axis, and a driver connected up with said holder for producing those two motions, the means for connecting up said driver to said holder, consisting of spiral gearing for producing the revolving motion, a clutch and stop for producing the intermittent rotations.

4. In a machine for grinding drills, the combination of a drill-holder continuously revolving about an outside axis, and intermittently rotary about its own axis, a driver connected up with said holder for producing those two motions, the intermittent rotations being through equal curves, a grinding-disk, and means for reciprocating the holder radially with respect to said disk.

5. In a machine for grinding drills, the combination of a drill-holder continuously revolving about an outside axis, and intermittently rotary about its own axis, a driver connected up with said holder for producing those two motions, the intermittent rotations being through equal curves, a grinding-disk, and means for reciprocating the holder radially with respect to said disk continuously, said means being governed by said driver automatically.

6. In a machine for grinding drills, a drill-holder continuously revolving about an outside axis, and intermittently rotary about its own axis, and continuously reciprocating and means for producing the several motions named herein.

7. In a machine for grinding drills, the combination of a drill-holder continuously revolving about an outside axis, and intermittently rotary about its own axis, and continuously reciprocating, and a grinding-disk whose axis intersects the axis of said holder, at predetermined phases of said axis and means for producing the several motions named herein.

8. In a machine for grinding drills, the combination of a drill-holder continuously revolving about an outside axis, and intermittently rotary about its own axis, a driver connected up with said holder for producing those two motions, and a grinding-disk whose axis intersects the axis of said holder.

9. In a machine for grinding drills, the combination of a drill-holder continuously revolving about an outside axis, and intermittently rotary about its own axis, a driver connected up with said holder for producing those two motions, the intermittent rotations being through equal curves, a grinding-disk, and means for reciprocating the holder radially with respect to said disk, a plane of the holder-axis intersecting the plane of the disk-axis.

10. In a machine for grinding drills, the combination of a grinding-disk, a driver, a drill-holder, and means connected up between the last two elements for automatically revolving said holder around an outside axis, and to and from the face of said disk, said outside axis intersecting the axis of the holder.

11. In a machine for grinding drills, the combination of a grinding-disk, a driver, a drill-holder, and means connected up between the last two elements for automatically revolving said holder around an outside axis, and to and from the face of said disk, said outside axis intersecting the axis of the holder at a point laterally of the point of the drill which is carried by said holder.

12. In a machine for grinding drills, the combination of a grinding-disk, a driver, a drill-holder, and means connected up between the last two elements for automatically revolving said holder around an outside axis and to and from the face of said disk, said outside axis intersecting the axis of the holder at a point within the body of the drill which is carried by said holder, to bring the bevel-surface which is beyond the cutting edge of the drill nearer the grinding-surface of the disk than said edge was brought, so that a clearance behind the cutting edge is produced.

13. In a machine for grinding drills, the combination of a rotating disk with a grinding-surface perpendicular to its own axis, a drill-holder with its own axis intersecting said surface at an acute angle, a driver, and means connected up between said driver and said holder for automatically revolving the point of the drill in said holder in a circle which is at an angle and tangent to said grinding-surface.

14. In a machine for grinding drills, the combination of a rotating disk with a grinding-surface perpendicular to its own axis, a drill-holder with its own axis intersecting said surface at an acute angle, a driver, and means connected up between said driver and said holder for automatically revolving the point of the drill in said holder in a circle which is at an angle and tangent to said grinding-surface, the angle between the axis of the holder and the grinding-surface being such that the cutting edge and contiguous conical surface of the drill remain in contact for a predetermined time with the grinding-surface at each revolution of the holder, and a device controlled by said driver for adjusting the drill twice in each revolution to bring the surfaces of the drill to be ground against said grinding-surface.

15. In a machine for grinding drills, the combination of a drill-holder continuously revolving about an outside axis, and intermittently rotary about its own axis, a driver connected up with said holder for producing those two motions, and a manual device for feeding said holder to and fro.

16. In a machine for grinding drills, the combination of a drill-holder continuously revolving about an outside axis, and intermittently rotary about its own axis, and a driver connected up with said holder for producing those two motions, said intermittent rotations being through semicircles, and a manual device for feeding said holder to and fro.

17. In a machine for grinding drills, the combination of a drill-holder, means for continuously revolving said holder about an outside axis, intermittently rotating it about its own axis, and continuously reciprocating the holder, and a manual device for feeding said holder to and fro.

18. In a machine for grinding drills, the combination of a drill-holder continuously revolving about an outside axis, and intermittently rotary about its own axis, a driver connected up with said holder for producing those two motions, the intermittent rotations being through equal curves, a grinding-disk, means for reciprocating the holder radially with respect to said disk, a plane of the holder-axis intersecting the plane of the disk-axis, and a manual device for feeding said holder to and fro.

19. In a machine for grinding drills, the combination of a grinding-disk, a driver, a drill-holder, means connected up between the last two elements for automatically revolving said holder around an outside axis, and to and from the face of said disk, said outside axis intersecting the axis of the holder, and a manual device for feeding said holder to and fro.

20. In a machine for grinding drills, the combination of a rotating disk with a grinding-surface perpendicular to its own axis, a drill-holder with its own axis intersecting said surface at an acute angle, a driver, means connected up between said driver and said holder for automatically revolving the point of the drill in said holder in a circle which is at an angle and tangent to said grinding-surface, and a manual device for feeding said holder to and fro.

21. In a machine for grinding drills, the combination of a drill-holder continuously revolving about an outside axis, and intermittently rotary about its own axis, a driver connected up with said holder for producing those two motions, and a continuously-rotating socket-wheel supporting said holder eccentrically.

22. In a machine for grinding drills, the combination of a drill-holder continuously revolving about an outside axis, and intermittently rotary about its own axis, and continuously reciprocating, a grinding-disk whose axis intersects the axis of said holder, at predetermined phases of said axis, and a continuously-rotating socket-wheel supporting said holder eccentrically and means for producing the several motions named herein.

23. In a machine for grinding drills, the combination of a drill-holder continuously revolving about an outside axis, and intermittently rotary about its own axis, a driver connected up with said holder for producing those two motions, a grinding-disk whose axis intersects the axis of said holder, and a continuously-rotating socket-wheel supporting said holder eccentrically.

24. In a machine for grinding drills, the combination of a grinding-disk, a driver, a drill-holder, and means connected up between the last two elements for automatically revolving said holder around an outside axis and to and from the face of said disk, said outside axis intersecting the axis of the holder at a point within the body of the drill which is carried by said holder, to bring the bevel-surface which is beyond the cutting edge of the drill nearer the grinding-surface of the disk than said edge was brought, so that a clearance behind the cutting edge is produced, and a continuously-rotating socket-wheel supporting said holder eccentrically.

25. In a machine for grinding drills, the combination of a drill-holder continuously revolving about an outside axis, and intermittently rotary about its own axis, a driver connected up with said holder for producing those two motions, a continuously-rotating socket-wheel supporting said holder eccentrically, a clutch between said socket-wheel and said holder, and a stop for disengaging said clutch intermittently, for causing a predetermined number of partial rotations during each revolution of said holder.

26. In a machine for grinding drills, the combination of a drill-holder continuously revolving about an outside axis, and intermittently rotary about its own axis, and continuously reciprocating, a grinding-disk whose axis intersects the axis of said holder, at predetermined phases of said axis, a continuously-rotating socket-wheel supporting said holder eccentrically, a clutch between said socket-wheel and said holder, and a stop for disengaging said clutch intermittently, for causing a predetermined number of partial rotations during each revolution of said holder.

27. In a machine for grinding drills, the combination of a drill-holder continuously revolving about an outside axis, and intermittently rotary about its own axis, a driver connected up with said holder for producing those two motions, a grinding-disk whose axis intersects the axis of said holder, and a continuously-rotating socket-wheel supporting said holder eccentrically, a clutch between said socket-wheel and said holder, and a stop for disengaging said clutch intermittently, for causing a predetermined number of partial rotations during each revolution of said holder.

28. In a machine for grinding drills, the combination of a grinding-disk, a driver, a drill-holder, means connected up between the last two elements for automatically revolving said holder around an outside axis and to and from the face of said disk, said outside axis intersecting the axis of the holder at a point within the body of the drill which is carried by said holder, to bring the bevel-surface which is beyond the cutting edge of the drill nearer the grinding-surface of the disk than said edge was brought, so that a clearance behind the cutting edge is produced, a continuously-rotating socket-wheel supporting said holder eccentrically, a clutch between said socket-wheel and said holder, and a stop for disengaging said clutch intermittently, for causing a predetermined number of partial rotations during each revolution of said holder.

29. In a machine for grinding drills, the combination of a drill-holder, a socket-wheel in which said holder is supported eccentrically to the axis of said wheel, a driving-shaft, and spiral gearing between said socket-wheel and said shaft.

30. In a machine for grinding drills, the combination of a drill-holder continuously revolving about an outside axis, and intermittently rotary about its own axis, a driver connected up with said holder for producing those two motions, a grinding-disk whose axis intersects the axis of said holder, and a device for continuously reciprocating said holder.

31. In a machine for grinding drills, the combination of a grinding-disk, a driver, a drill-holder, means connected up between the last two elements for automatically revolving said holder around an outside axis, and to and from the face of said disk, said outside axis intersecting the axis of the holder, and a device for continuously reciprocating said holder.

32. In a machine for grinding drills, the combination of a grinding-disk, a driver, a drill-holder, means connected up between the last two elements for automatically revolving said holder around an outside axis and to and from the face of said disk, said outside axis intersecting the axis of the holder at a point within the body of the drill which is carried by said holder, to bring the bevel-surface which is beyond the cutting edge of the drill nearer the grinding-surface of the disk than said edge was brought, so that a clearance behind the cutting edge is produced, and a device for continuously reciprocating said holder.

33. In a machine for grinding drills, the combination of a rotating disk with a grinding-surface perpendicular to its own axis, a drill-holder with its own axis intersecting said surface at an acute angle, a driver, means connected up between said driver and said holder for automatically revolving the point of the drill in said holder in a circle which is at an angle and tangent to said grinding-surface, and a device for continuously reciprocating said holder.

34. In a machine for grinding drills, the combination of a drill-holder, a socket-wheel in which said holder is supported eccentrically to the axis of said wheel, and a device for continuously reciprocating said holder.

35. In a machine for grinding drills, the combination of a drill-holder, a socket-wheel in which said holder is supported eccentrically to the axis of said wheel, and at such an angle that the axis of said holder and said wheel intersect each other at a point within the material of the drill carried by said holder during normal operation, and a device for continuously reciprocating said holder.

36. In a machine for grinding drills, the combination of a drill-holder, mechanism revolving said drill-holder about an outside axis, a device for intermittently rotating said holder, means for reciprocating said holder, and a driver connected up with the above-named elements.

37. In a machine for grinding drills, the combination of a drill-holder, mechanism revolving said drill-holder about an outside axis, a device for intermittently rotating said holder, means for reciprocating said holder, a driver connected up with the above-named elements, and a handle for reciprocating the holder in a different direction from the other reciprocations.

38. In a machine for grinding drills, the combination of a drill-holder, mechanism revolving said drill-holder about an outside axis, a device for intermittently rotating said holder, means for reciprocating said holder, a driver connected up with the above-named elements, said mechanism consisting of a socket-wheel in whose socket is carried said holder, teeth on said wheel, a shaft for the driver, and a pinion on said shaft gearing with said wheel.

39. In a machine for grinding drills, the combination of a drill-holder, mechanism revolving said drill-holder about an outside axis, a device for intermittently rotating said holder, means for reciprocating said holder, a driver connected up with the above-named elements, said mechanism consisting of a socket-wheel in whose socket is carried said holder, teeth on said wheel, a shaft for the driver and a pinion on said shaft gearing with said wheel, said wheel having its bearing at the periphery thereof.

40. In a machine for grinding drills, the combination of a drill-holder, mechanism revolving said drill-holder about an outside axis, a device for intermittently rotating said holder, means for reciprocating said holder, a driver connected up with the above-named elements, the above-named elements being so disposed, and the said motions being so related, that the point of the drill in said holder moves repeatedly in a closed curve, and that the drill intermittently rotates, and a grinding-disk whose surface is tangent to said curve and which is tangent successively to the ground surfaces of said drill.

41. In a machine for grinding drills, the combination of a drill-holder, mechanism revolving said drill-holder about an outside axis, a device for intermittently rotating said holder, means for reciprocating said holder, a driver connected up with the above-named elements, a handle for reciprocating the holder in a different direction from the other reciprocations, the above-named elements being so disposed, and the said motions being so related, that the point of the drill in said holder moves repeatedly in a closed curve, and that the drill intermittently rotates, and a grinding-disk whose surface is tangent to said curve and which is tangent successively to the ground surfaces of said drill.

42. In a machine for grinding drills, the combination of a drill-holder, mechanism revolving said drill-holder about an outside axis, a device for intermittently rotating said holder, means for reciprocating said holder, a driver connected up with the above-named elements, said mechanism consisting of a socket-wheel in whose socket is carried said holder, teeth on said wheel, a shaft for the driver, a pinion on said shaft gearing with said wheel, the above-named elements being so disposed, and the said motions being so related, that the point of the drill in said holder moves repeatedly in a closed curve, and that the drill intermittently rotates, and a grinding-disk whose surface is tangent to said curve and which is tangent successively to the ground surfaces of said drill.

43. In a machine for grinding drills, the combination of a drill-holder, a socket-wheel supporting said holder eccentrically, mechanism for revolving said wheel continuously, a device for intermittently rotating said holder, means for reciprocating all of the above-named elements continuously, and a driver connected up with said elements for producing said motions.

44. In a machine for grinding drills, the combination of a drill-holder, a socket-wheel supporting said holder eccentrically, mechanism for revolving said wheel continuously, a device for intermittently rotating said holder, means for reciprocating all of the above-named elements continuously, and a driver connected up with said elements for producing said motions, said device consisting of a clutch between said wheel and said holder, a projection on said holder, and a stop in the path of said projection for disengaging said clutch and rotating said holder during the time that said stop is against said projection.

45. In a machine for grinding drills, the combination of a drill-holder, a socket-wheel supporting said holder eccentrically, mechanism for revolving said wheel continuously, a device for intermittently rotating said holder, means for reciprocating all of the above-named elements continuously, a driver connected up with said elements for producing said motions, said device consisting of a clutch between said wheel and said holder, a projection on said holder, a stop in the path of said projection for disengaging said clutch and rotating said holder during the time that said stop is against said projection, said clutch consisting of a spring-pin projecting from said wheel, and a notched collar surrounding and fixed to said holder.

46. In a machine for grinding drills, the combination of a drill-holder, a socket-wheel supporting said holder eccentrically, mechanism for revolving said wheel continuously, a device for intermittently rotating said holder, means for reciprocating all of the above-named elements continuously, a driver connected up with said elements for producing said motions, said device consisting of a clutch between said wheel and said holder, a projection on said holder, and a stop in the path of said projection for disengaging said clutch and rotating said holder during the time that said stop is against said projection, said projection consisting of a clamp detachable and adjustable relatively to said holder.

47. In a machine for grinding drills, the combination of a drill-holder, a socket-wheel supporting said holder eccentrically, mechanism for revolving said wheel continuously, a device for intermittently rotating said holder, means for reciprocating all of the above-named elements continuously, a driver connected up with said elements for producing said motions, said device consisting of a clutch between said wheel and said holder, a projection on said holder, and a stop in the path of said projection for disengaging said clutch and rotating said holder during the time that said stop is against said projection, said projection consisting of a clamp detachable and adjustable relatively to said holder, said clamp consisting of a ring having set screws for pressing against said holder, said projection extending in both directions from said ring.

48. In a machine for grinding drills, the combination of a drill-holder, a socket-wheel supporting said holder eccentrically, mechanism for revolving said wheel continuously, a device for intermittently rotating said holder, means for reciprocating all of the above-named elements continuously, and a driver connected up with said elements for producing said motions, said device consisting of a clutch between said wheel and said holder, a projection on said holder, a stop in the path of said projection for disengaging said clutch and rotating said holder during the time that said stop is against said projection, and a bearing for said wheel supporting said pin.

49. In a machine for grinding drills, the combination of a drill-holder, a socket-wheel supporting said holder eccentrically, mechanism for revolving said wheel continuously, a device for intermittently rotating said holder, means for reciprocating all of the above-named elements continuously, and a driver connected up with said elements for producing said motions, said device consisting of a clutch between said wheel and said holder, a projection on said holder, a stop in the path of said projection for disengaging said clutch and rotating said holder during the time that said stop is against said projection, the above-named elements being carried by a common slide, a grinding-disk, and a manual device for moving said slide to and from said disk.

50. In a machine for grinding drills, the combination of a drill-holder, a socket-wheel supporting said holder eccentrically, mechanism for revolving said wheel continuously, a device for intermittently rotating said holder, means for reciprocating all of the above-named elements continuously, and a driver connected up with said elements for producing said motions, said device consisting of a clutch between said wheel and said holder, a projection on said holder, a stop in the path of said projection for disengaging said clutch and rotating said holder during the time that said stop is against said projection, said clutch consisting of a spring-pin projecting from said wheel, and a notched collar surrounding and fixed to said holder, the above-named elements being carried by a common slide, a grinding-disk, and a manual device for moving said slide to and from said disk.

51. In a machine for grinding drills, the combination of a drill-holder, a socket-wheel supporting said holder eccentrically, mechanism for revolving said wheel continuously, a device for intermittently rotating said holder, means for reciprocating all of the above-named elements continuously, a driver connected up with said elements for producing said motions, said device consisting of a clutch between said wheel and said holder, a projection on said holder, a stop in the path of said projection for disengaging said clutch and rotating said holder during the time that said stop is against said projection, said projection consisting of a clamp detachable and adjustable, relatively to said holder, the above-named elements being carried by a common slide, a grinding-disk, and a manual device for moving said slide to and from said disk.

52. In a machine for grinding drills, the combination of a drill-holder, a socket-wheel supporting said holder eccentrically, mechanism for revolving said wheel continuously, a device for intermittently rotating said holder, means for reciprocating all of the above-named elements continuously, a driver connected up with said elements for producing said motions, said device consisting of a clutch between said wheel and said holder, a projection on said holder, a stop in the path of said projection for disengaging said clutch and rotating said holder during the time that said stop is against said projection, said projection consisting of a clamp detachable and adjustable relatively to said holder, said clamp consisting of a ring having set-screws for pressing against said holder, said projection extending in both directions from said ring, the above-named elements being carried by a common slide, a grinding-disk, and a manual device for moving said slide to and from said disk.

53. In a machine for grinding drills, the combination of a drill-holder, a socket-wheel supporting said holder eccentrically, mechanism for revolving said wheel continuously, a device for intermittently rotating said holder, means for reciprocating all of the above-named elements continuously, and a driver connected up with said elements for producing said motions, said device consisting of a clutch between said wheel and said holder, a projection on said holder, a stop in the path of said projection for disengaging said clutch and rotating said holder during the time that said stop is against said projection, a bearing for said wheel supporting said pin, the above-named elements being carried by a common slide, a grinding-disk, and a manual device for moving said slide to and from said disk.

54. In a machine for grinding drills, the combination of a drill-holder, a socket-wheel supporting said holder eccentrically, mechanism for revolving said wheel continuously, a device for intermittently rotating said holder, means for reciprocating all of the above-named elements continuously, and a driver connected up with said elements for producing said motions, said means consisting of a cam and rollers for said cam.

55. In a machine for grinding drills, the combination of a drill-holder, a socket-wheel supporting said holder eccentrically, mechanism for revolving said wheel continuously, a device for intermittently rotating said holder, means for reciprocating all of the above-named elements continuously, and a driver connected up with said elements for producing said motions, said device consisting of a worm on said driver, a worm-wheel engaged with said worm, a base-plate for said socket-wheel, forming a bearing for said worm-wheel, a cam carried by said worm-wheel, and rollers bearing against said cam for producing the reciprocating motions.

56. In a machine for grinding drills, the combination of a drill-holder, a socket-wheel supporting said holder eccentrically, mechanism for revolving said wheel continuously, a device for intermittently rotating said holder, means for reciprocating all of the above-named elements continuously, a driver connected up with said elements for producing said motions, a slide supporting all the above-named elements, a handle for moving the same to and fro, a base-plate for the socket-wheel, and devices connected up between said driver and said slide for reciprocating said base-plate.

57. In a machine for grinding drills, the combination of a drill-holder, a socket-wheel supporting said holder eccentrically, mechanism for revolving said wheel continuously, a device for intermittently rotating said holder, means for reciprocating all of the above-named elements continuously, a driver connected up with said elements for producing said motions, a slide supporting all the above-named elements, a handle for moving the same to and fro, a base-plate for the socket-wheel, devices connected up between said driver and said slide for reciprocating said base-plate, the last-named device consisting of a rotary cam on the base-plate, and grinding-rollers on the slide.

58. In a machine for grinding drills, the combination of a drill-holder, mechanism for revolving said drill-holder about an outside axis, a device for intermittently rotating said holder, means for reciprocating said holder, and a driver connected up with the above-named elements, said mechanism consisting of a socket-wheel in whose socket is carried said holder, teeth on said wheel, a shaft for the driver, and a pinion on said shaft gearing with said wheel, said device consisting of a clutch between said wheel and said holder, a projection on said holder, and a stop in the path of said projection for disengaging said clutch and rotating said holder during the time that said stop is against said projection.

59. In a machine for grinding drills, the combination of a drill-holder, mechanism for revolving said drill-holder about an outside axis, a device for intermittently rotating said holder, means for reciprocating said holder, and a driver connected up with the above-named elements, said mechanism consisting of a socket-wheel in whose socket is carried said holder, teeth on said wheel, a shaft for the driver, and a pinion on said shaft gearing with said wheel, said device consisting of a clutch between said wheel and said holder, a projection on said holder, and a stop in the path of said projection for disengaging said clutch and rotating said holder during the time that said stop is against said projection, said device consisting of a worm on said driver, a worm-wheel engaged with said worm, a base-plate for said socket-wheel forming a bearing for said worm-wheel, a cam carried by said worm-wheel, and rollers bearing against said cam for producing the reciprocating motions.

60. In a machine for grinding drills, the combination of a drill-holder, mechanism for revolving said drill-holder about an outside axis, a device for intermittently rotating said holder, means for reciprocating said holder, a driver connected up with the above-named elements, said mechanism consisting of a socket-wheel in whose socket is carried said holder, teeth on said wheel, a shaft for the driver, and a pinion on said shaft gearing with said wheel, said device consisting of a clutch between said wheel and said holder, a projection on said holder, and a stop in the path of said projection for disengaging said clutch and rotating said holder during the time that said stop is against said projection, said device consisting of a worm on said driver, a worm-wheel engaged with said worm, a base-plate for said socket-wheel forming a bearing for said worm-wheel, a cam carried by said worm-wheel, and rollers bearing against said cam for producing the reciprocating motions, a slide supporting all the above-named elements, a handle for moving the same to and fro, a base-plate for the socket-wheel, and devices connected up between said driver and said slide for reciprocating said base-plate.

61. In a machine for grinding drills, the combination of a drill-holder, a socket-wheel in which said holder is supported eccentrically to the axis of said wheel, a device for continuously reciprocating said holder, and a brake for holding said device stationary.

62. In a machine for grinding drills, the combination of a grinding-disk, a driver, a drill-holder, means connected up between the last two elements for automatically revolving said holder around an outside axis, and to and from the face of said disk, said outside axis intersecting the axis of the holder, a device for continuously reciprocating said holder parallel to the grinding-surface of said disk, a manually-movable slide supporting the said device for feeding the holder to and fro from said disk, said device consisting of a cam supporting the tool-holder and rollers, a second slide supporting said rollers, and a brake for locking the two slides together.

63. In a machine for grinding drills, the combination of a grinding-disk, a driver, a drill-holder, means connected up between the last two elements for automatically revolving said holder around an outside axis and to and from the face of said disk, said outside axis intersecting the axis of the holder at a point within the body of the drill which is carried by said holder, to bring the bevel-surface which is beyond the cutting edge of the drill nearer the grinding-surface of the disk than said edge was brought, so that a clearance behind the cutting edge is produced, a device for continuously reciprocating said holder parallel to the grinding-surface of said disk, a manually-movable slide supporting the said device for feeding the holder to and fro from said disk, said device consisting of a cam supporting the tool-holder and rollers, a second slide supporting said rollers, and a brake for locking the two slides together.

64. In a machine for grinding drills, the combination of a rotating disk with a grinding-surface perpendicular to its own axis, a drill-holder with its own axis intersecting said surface at an acute angle, a driver, means connected up between said driver and said holder for automatically revolving the point of the drill in said holder in a circle which is at an angle and tangent to said grinding-surface, a device for continuously reciprocating said holder parallel to the grinding-surface of said disk, a manually-movable slide supporting the said device for feeding the holder to and fro from said disk, said device consisting of a cam supporting the tool-holder and rollers, a second slide supporting said rollers, and a brake for locking the two slides together.

65. In a machine for grinding drills, the combination of a drill-holder, a socket-wheel supporting said holder eccentrically, mechanism for revolving said wheel continuously, a device for intermittently rotating said holder, means for reciprocating all of the above-named elements continuously, a driver connected up with said elements for producing said motions, said means consisting of a cam and rollers for said cam, a slide supporting the rollers, and a brake for locking the slide stationary.

66. In a machine for grinding drills, the combination of a drill-holder continuously revolving about an outside axis, and intermittently rotary about its own axis, a driver connected up with said holder for producing those two motions, the intermittent rotations being through equal curves, a grinding-disk, means for reciprocating the holder radially with respect to said disk continuously, said means being governed by said driver automatically, and a device controlled by said driver for intermittently feeding said holder toward said disk.

67. In a machine for grinding drills, the combination of a drill-holder continuously revolving about an outside axis, and intermittently rotary about its own axis, a driver connected up with said holder for producing those two motions, a grinding-disk whose axis intersects the axis of said holder, and a device controlled by said driver for intermittently feeding said holder toward said disk.

68. In a machine for grinding drills, the combination of a grinding-disk, a driver, a drill-holder, means connected up between the last two elements for automatically revolving said holder around an outside axis, and to and from the face of said disk, said outside axis intersecting the axis of the holder, and a device controlled by said driver for intermittently feeding said holder toward said disk.

69. In a machine for grinding drills, the combination of a grinding-disk, a driver, a drill-holder, means connected up between the last two elements for automatically revolving said holder around an outside axis, and to and from the face of said disk, said outside axis intersecting the axis of the holder, a manual device for feeding said holder to and fro, and a device controlled by said driver for intermittently feeding said holder toward said disk.

70. In a machine for grinding drills, the combination of a drill-holder, a grinding-disk, means for reciprocating the holder along the face of said disk, means for feeding said holder intermittently toward said disk, means for turning the holder for a grinding action against said disk, means for rotating said holder to bring a different cutting edge of the drill against said disk, and a driver connected up with all of said means for grinding a drill automatically.

In testimony whereof I have hereunto signed my name this 1st day of July, 1904.

FRIEDRICH SCHMALTZ.

Witnesses:
L. E. HICKS,
W. A. KELLY.